United States Patent
Suzuki (10) Patent No.: US 7,677,778 B2
(45) Date of Patent: Mar. 16, 2010

(54) PROJECTOR LAMP UNIT

(75) Inventor: Masakazu Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 276 days.

(21) Appl. No.: 11/602,061

(22) Filed: Nov. 20, 2006

(65) Prior Publication Data

US 2007/0115669 A1    May 24, 2007

(30) Foreign Application Priority Data

Nov. 21, 2005 (JP) .......................... P2005-335237

(51) Int. Cl.
*B60Q 1/00* (2006.01)
(52) U.S. Cl. ...................... 362/538; 362/362; 362/268; 362/293; 362/300; 362/258; 362/387; 362/391; 362/267
(58) Field of Classification Search .............. 362/362, 362/268, 293, 298, 300, 258, 387, 391, 267
See application file for complete search history.

(56) References Cited

U.S. PATENT DOCUMENTS 3,233,092 A * 2/1966 Umholtz ................. 362/183
5,347,324 A * 9/1994 Sasaki et al. .............. 348/789
6,783,248 B2 * 8/2004 Miyata ....................... 353/85
2003/0201703 A1 * 10/2003 Horiuchi et al. ............ 313/113

FOREIGN PATENT DOCUMENTS

| JP | 3004793 | 9/1994 |
| JP | 8-203421 | 8/1996 |
| JP | 2002-75014 | 3/2002 |
| JP | 2002-222601 | 8/2002 |

OTHER PUBLICATIONS

Patent Abstracts of Japan, Publication No. 2002-075014, Publication Date: Mar. 15, 2002, 2 pages.
Patent Abstracts of Japan, Publication No. 08-203421, Publication Date: Aug. 9, 1996, 2 pages.
Patent abstracts of Japan, Publication No. 2002-222601, Publication Date: Aug. 9, 2002, 2 pages.
Mechanical English translation of Japanese patent application No. 3004793, Publication Date: Sep. 14, 1994, 5 pages.

* cited by examiner

*Primary Examiner*—Sandra L O'Shea
*Assistant Examiner*—Jessica L McMillan
(74) *Attorney, Agent, or Firm*—Osha • Liang LLP

(57) ABSTRACT

A projector lamp unit includes: a lamp; a lamp case, housing the lamp; a wire protective member, attached to the lamp case, and comprised from resin having a smaller thermal conductivity than the lamp case; and a resin-covering wire, led from the lamp to the outside of the lamp case through a hole provided with the wire protective member.

7 Claims, 8 Drawing Sheets

PROJECTOR LAMP UNIT

BACKGROUND OF THE INVENTION

The present invention relates to a projector lamp unit, and more particularly, to a projector lamp unit for which a countermeasure is taken to enhance safety by means of preventing thermal deterioration of a resin-covering wire pulled out of the inside of a lamp case housing a lamp.

Figure 8:
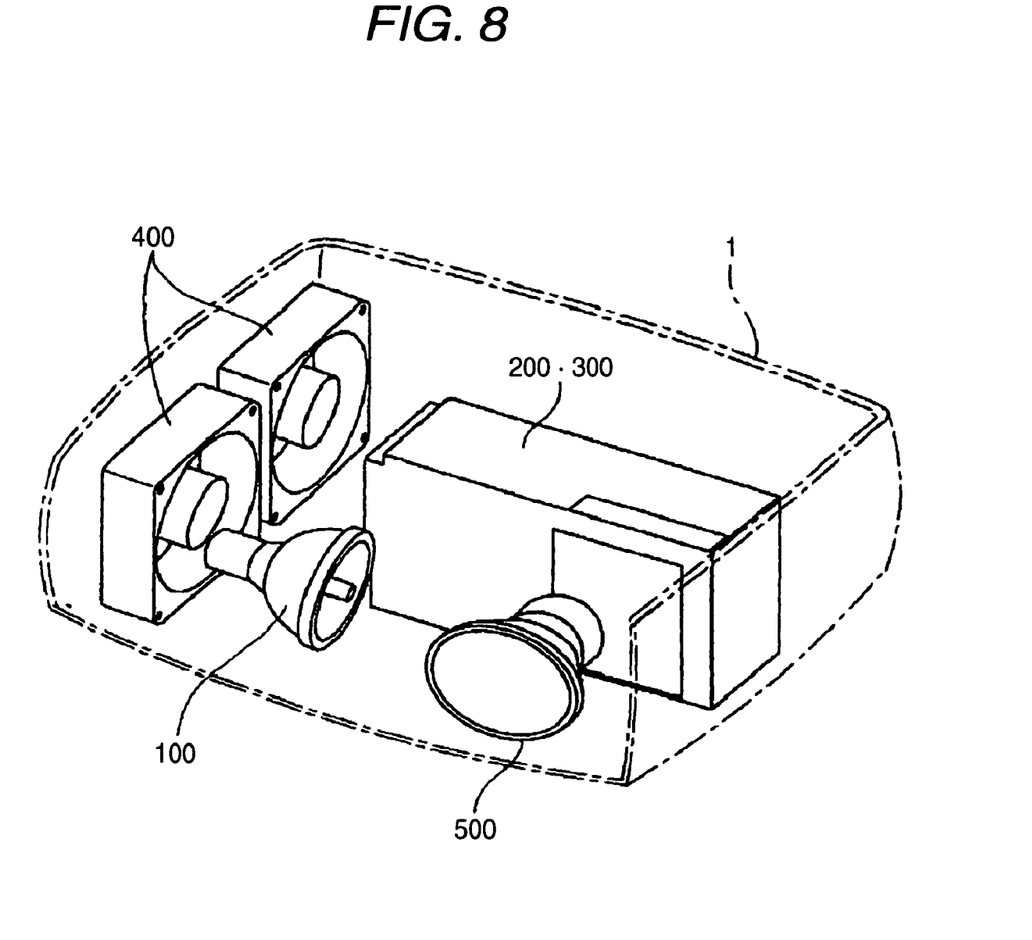
FIG. 8 is a descriptive view showing the basic configuration of a projector.

FIG. 8 descriptively shows the basic configuration of a projector. In this projector, a fan 400 used for generating a current of air and a lens unit 500 for projection purpose as well as a lamp unit 100, an engine 200, and a power unit 300 are incorporated in a flat box-shaped housing. An image projected by the lens unit 500 is displayed on a screen located ahead of the lens unit while the lamp unit 100 is taken as a light source. In the projector of this type, the lamp unit 100 is one of the heat-producing sources that generate the highest heat.

Incidentally, the lamp unit 100 has a lamp case made from aluminum and a lamp accommodated in the lamp case. A resin-covering feeding wire led from the lamp is pulled out of the inside of the lamp case. A coating forming a resin sheath layer of the resin-coating wire is provided with heat resistance of about 200° C. or thereabouts. In contrast, the lamp case is expected to be heated up to 150° C. or more as a result of operation of the lamp unit 100.

In such a projector, even when the lamp case is heated up to 150° C. or more, the coating of the resin-covering wire of the lamp unit 100 is provided with heat resistance of about 200° C. Hence, the coating is considered to be impervious to thermal deterioration. In reality, when the coating of the resin-covering wire remains in contact with a highly-heated lamp case at a location where the wire is inserted into the lamp case, there may arise a case where the coating melts. Provided that the coating melts to thus make an internal core wire bare, a high-voltage current of the resin-coating wire is connected to a ground level of the lamp case, which may break electronic components, such as a digital micromirror device (DMD). Moreover, the hot air circulating through the inside of the lamp case by means of convection is also heated up to about 200° C. Therefore, the air continually contacts the coating of the resin-covering wire to thus thermally deteriorate the coating, or the coating is deteriorated upon exposure to UV radiation. Moreover, minimizing emission of the hot air in the lamp case to the outside by way of the location where the resin-coating wire is inserted into the lamp case is desirable. If emission of such a hot air is not sufficiently avoided, the internal temperature of the housing will be excessively increased, which may create various inconveniences.

Meanwhile, there is a related lamp unit where an end of the lead wire which is led from the lamp and routed through the internal space of the house, is connected to a terminal attached to the house housing a lamp with a mirror (see, e.g., JP-A-2002-75014).

In a display element of a large-size display device, a lead wire withdrawn from the lamp is made short, and the end of the lead wire is connected to a connector section via a conductive pattern (see, e.g., JP-A-8-203421). Moreover, there are a light source (see, e.g., JP-A-2002-222601) where a cylindrical metal tube, by way of which a power-feeding line drawn from a discharge lamp is to be inserted, is provided on a curved surface of a concave reflection mirror provided around the discharge lamp, and a short arc metal halide lamp (see, e.g., Japanese Utility Model Registration No. 3004793) where a wire led from a short arc metal halide lamp is fixed to a metallic terminal attached to a reflection mirror.

However, JP-A-2002-75014, JP-A-8-203421, JP-A-2002-222601 and Japanese Utility Model Registration No. 3004793 do not suggest any countermeasures against thermal deterioration of a coating of a lead wire, a power-feeding line, or a wire corresponding to the resin-covering wire described at the outset.

SUMMARY

It is therefore an object of the invention to provide a projector lamp unit which can solve the drawbacks described at the outset; namely, the drawback of the risk of the coating of the resin-covering wire being heated up to a high temperature to thus melt at a location where the wire is inserted into the lamp case, and the drawback of the coating being thermally deteriorated as a result of a high temperature air continually contacting the coating of the resin-covering wire or the coating being deteriorated upon exposure to UV radiation.

It is also an object of the invention to provide a projector lamp unit capable of avoiding occurrence of a decrease in various performance capabilities of a projector by means of preventing emission of a high temperature in a lamp case to the outside via a location where the resin-covering wire is inserted into the lamp case.

In order to achieve the object, according to the invention, there is provided a projector lamp unit comprising:

a lamp;

a lamp case, comprised of aluminum, and housing the lamp;

a wire protective member, attached to a rear end of the lamp case, and comprised from resin having a smaller thermal conductivity than the lamp case; and a resin-covering wire, straightforwardly led from a rear end of the lamp to the outside of the lamp case, and inserted into a hole provided with the wire protective member, wherein the lamp case is divided into first and second case elements, the wire protective member is divided into first and second members at a location where the hole is transversely crossed, the lamp case is formed by means of fastening together the first and second case elements through screw-engagement, a projection piece portion for use in screw-engagement provided on the wire protective member is fastened to the first and second case elements by means of an attachment screw which fastens the first and second case elements through screw-engagement, the resin-covering wire inserted into the hole is nipped between the first and second members, and a ventilation clearance at a location where the resin-covering wire is inserted is minimized, and the wire protective member is provided with a pair of projection pieces which extend toward the rear end of the lamp and are placed on both sides of the resin-covering wire such that the resin-covering wire is arranged between the projection pieces.

DETAIL DESCRIPTION OF PREFERRED EMBODIMENTS

Figure 1:
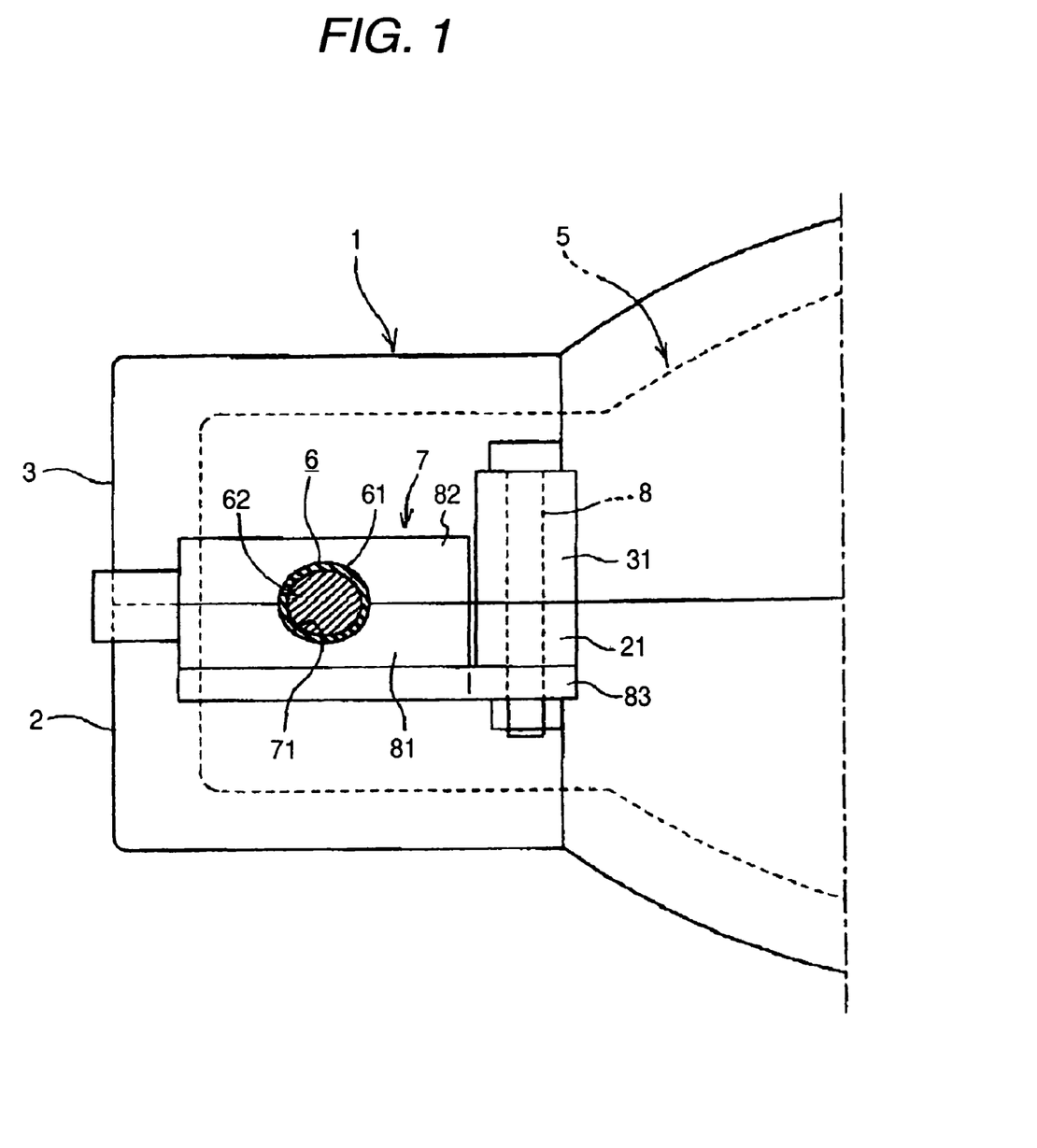
FIG. 1 is a schematic side view of a lamp unit according to an embodiment of the present invention.
Figure 2:
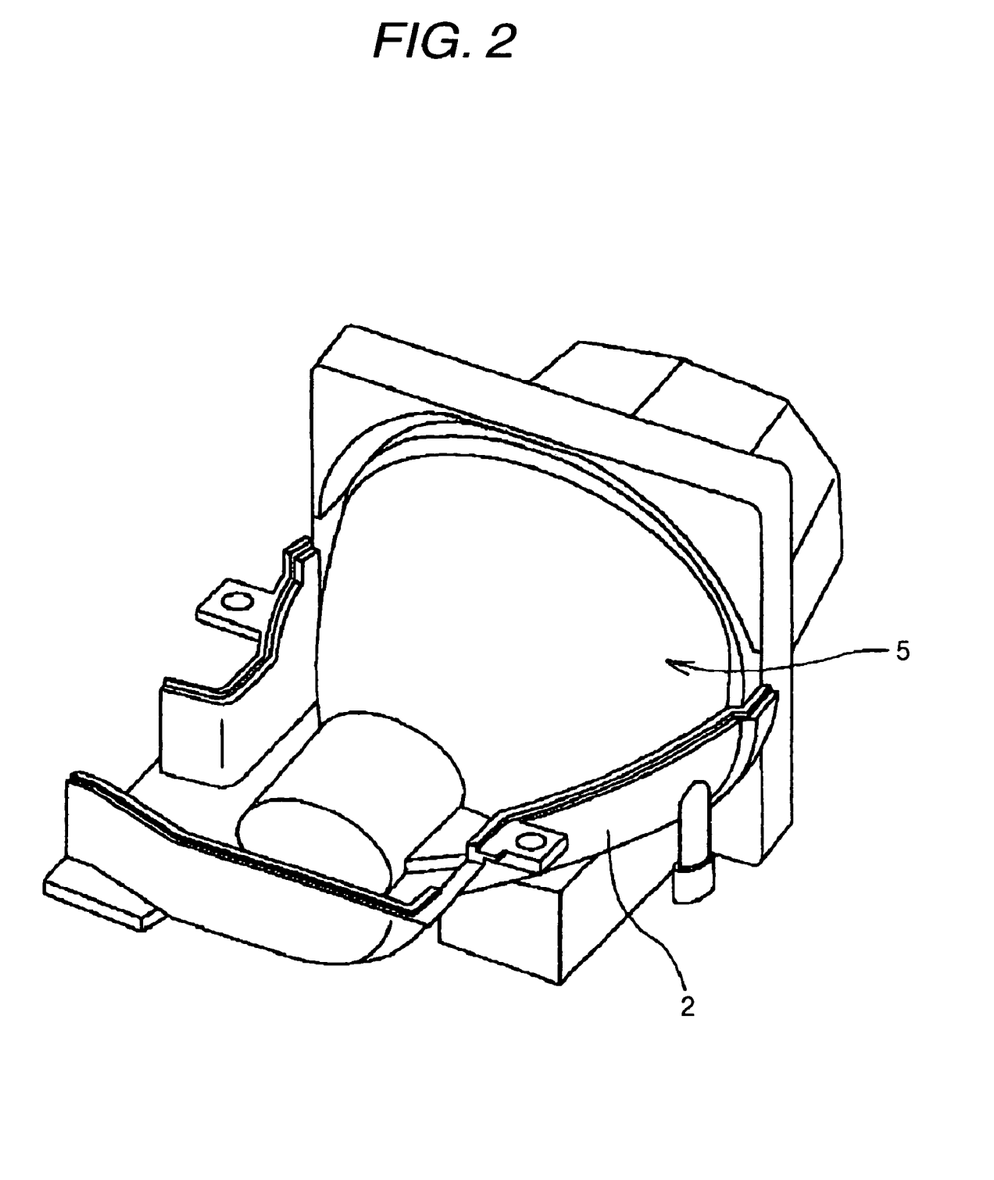
FIG. 2 is a schematic perspective view showing the internal structure of the lamp unit.
Figure 3:
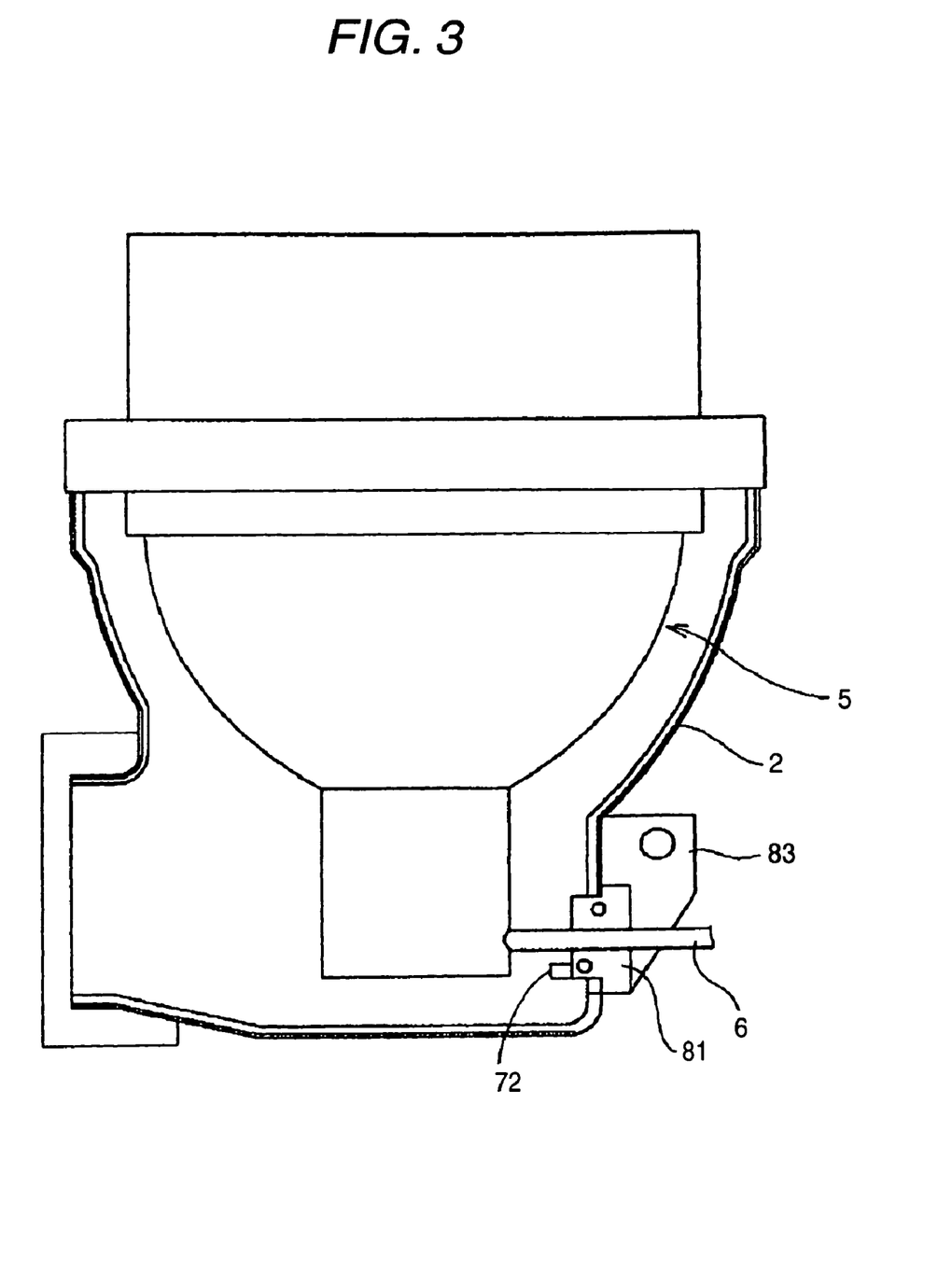
FIG. 3 is a schematic plan view showing the internal structure of the lamp unit with a lower cap of a wire protective member being attached to the lamp case.
Figure 4:
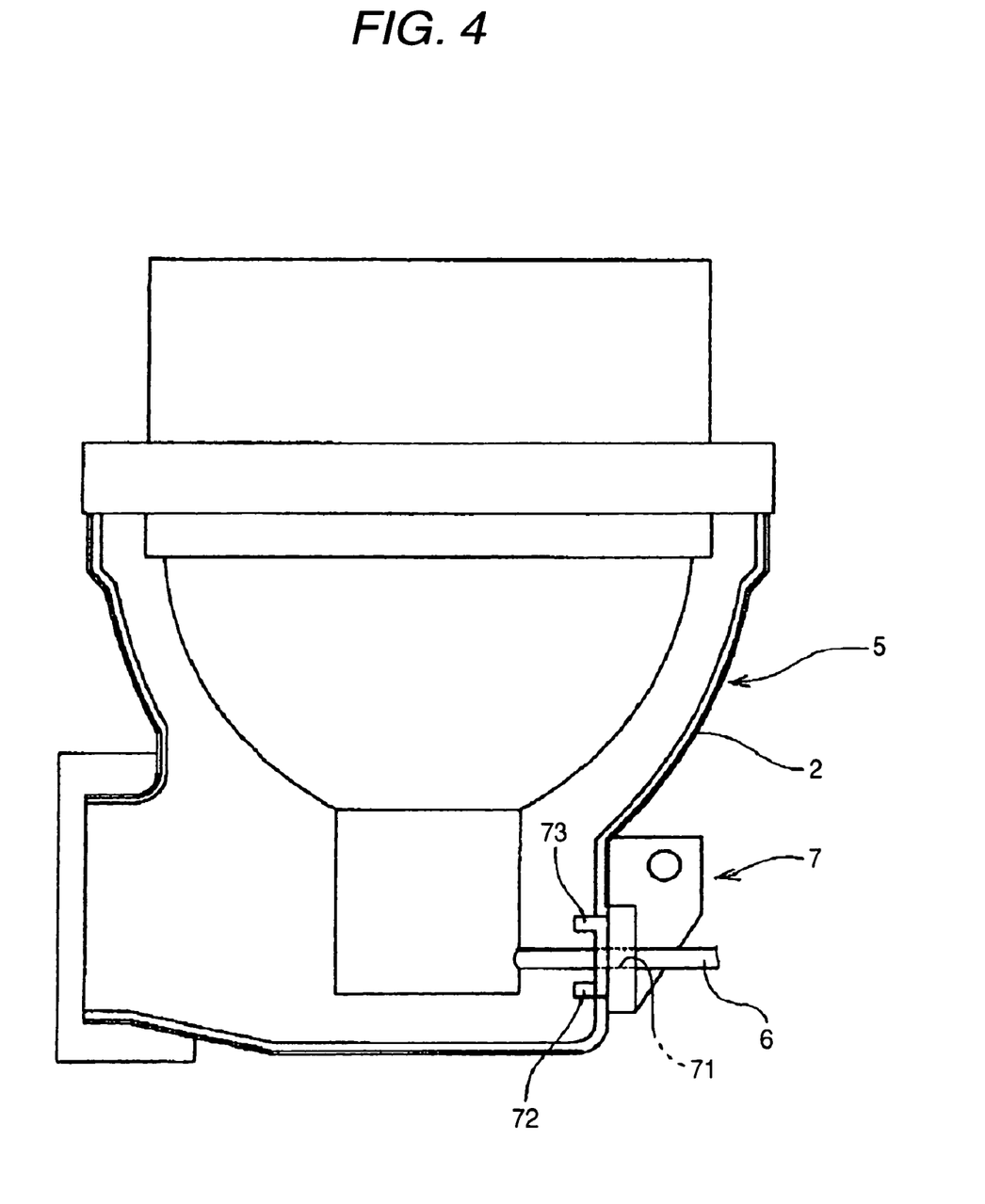
FIG. 4 is a schematic plan view showing the internal structure of the lamp unit with the wire protective member being attached to the lamp case.

In FIG. 1, reference numeral 1 designates a lamp case. The lamp case 1 is divided into a lower case element 2 and an upper case element 3. These two case elements 2, 3 are coupled together, whereby a hollow lamp case 1 is formed. A lamp 5 is housed in this lamp case 1. The lamp 5 has a light-emitting source and a light reflection member. As shown in FIG. 3 or 4, a resin-covering wire 6 for power feeding purpose connected to the light-emitting source extends straightforwardly, sideways from a rear end of a lamp 5. The wire protective member 7 is attached to a rear end of the lamp case 1. The resin-covering wire 6 is inserted into a hole 71 formed in the wire protective member 7, and is drawn out of the inside of the lamp case 1. A resin formed member whose thermal conductivity is smaller than that of the lamp case 1 is used for the wire protective member 7.

As in the case of the projector described by reference to FIG. 8, the lamp unit is incorporated in a flat box-shaped housing along with an engine 200 and a power unit 300. An image projected by a lens unit 500 is displayed on a screen located ahead of the lens unit while the lamp unit 100 is taken as a light source.

In this lamp unit, the lamp case 1 is made of aluminum. In a resin-covering wire 6, an internal core wire 62 is covered with a coating 61. Resin having heat resistance of about 200° C. is used for the coating 61.

In the above configuration, the resin-covering wire 6 is inserted into a hole 71 of the wire protective member 7 at a location where the resin-covering wire 6 is inserted into the lamp case 1. Therefore, the resin-covering wire 6 does not contact directly with the lamp case 1. Further, the heat of the lamp case 1 propagates to the coating 61 of the resin-covering wire 6 via the wire protective member 7 whose thermal conductivity is smaller than that of the lamp case 1. Therefore, the heat of the lamp case 1 heated up to 150° C. or more becomes less likely to propagate to the coating 61 of the resin-covering wire 6, and it is hard for the coating 61 to thermally deteriorate. It does not occur that the coating 61 melts to thus make the internal core wire 62 bare. Consequently, there does not arise a case where a high-voltage current of the resin-covering wire 6 is connected to the ground level of the lamp case 1, which in turn prevents infliction of damage to electronic components such as a DMD.

As shown in FIG. 4, in the present embodiment, a pair of projection pieces 72, 73 are provided on the wire protective member 7, wherein the projection pieces 72, 73 extend toward the rear end of the lamp 5 and are provided on both sides of the resin-covering wire 6 such that the wire 6 is arranged between the projection pieces 72, 73. By means of this structure, the coating 61 of the resin-covering wire 6 is covered with the projection pieces 72, 73. A decrease in the extent to which thermal deterioration is induced by the current of hot air circulating through the inside of the lamp case 1 by means of convection was ascertained. Moreover, a decrease in the extent to which the coating 61 of the resin-covering wire 6 is deteriorated upon exposure to UV radiation was ascertained.

In the present embodiment, the size of the hole 71 of the wire protective member 7 is set so as to become equal to or slightly smaller than the outer diameter of the resin-covering wire 6. By means of this setting, forming a ventilation clearance at the location where the resin-covering wire 6 is inserted into the hole 71 is prevented, or the ventilation clearance is minimized. Accordingly, the opportunity of emission of the hot air in the lamp case 1 to the outside from the location, where the resin-covering wire 6 is inserted, is minimized. This is useful in suppressing an excessive increase in the internal temperature of the housing of the projector. Consequently, the user can enjoy a stable image without involvement of infliction of thermal damage to various components or occurrence of faulty operation, which would otherwise be caused by increase in the internal temperature of the housing of the projector.

Figure 5:
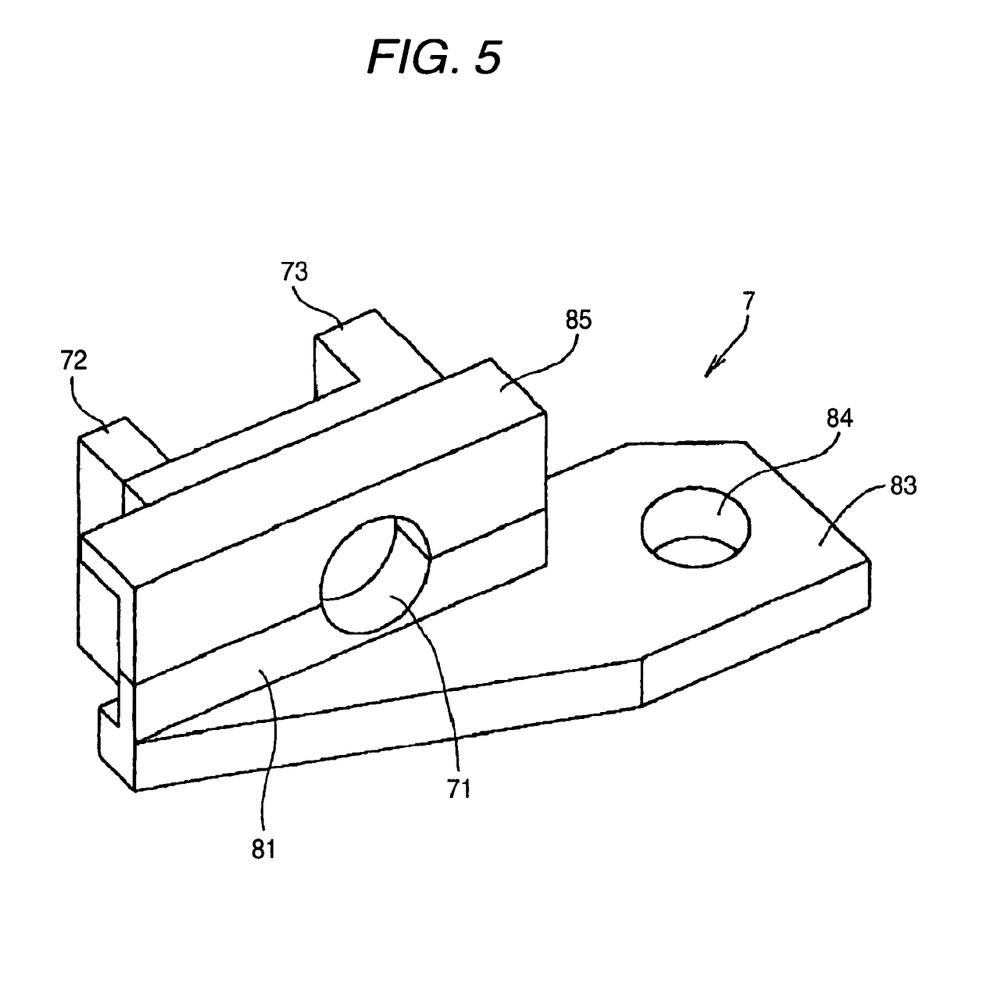
FIG. 5 is a schematic perspective view showing the wire protective member.
Figure 6:
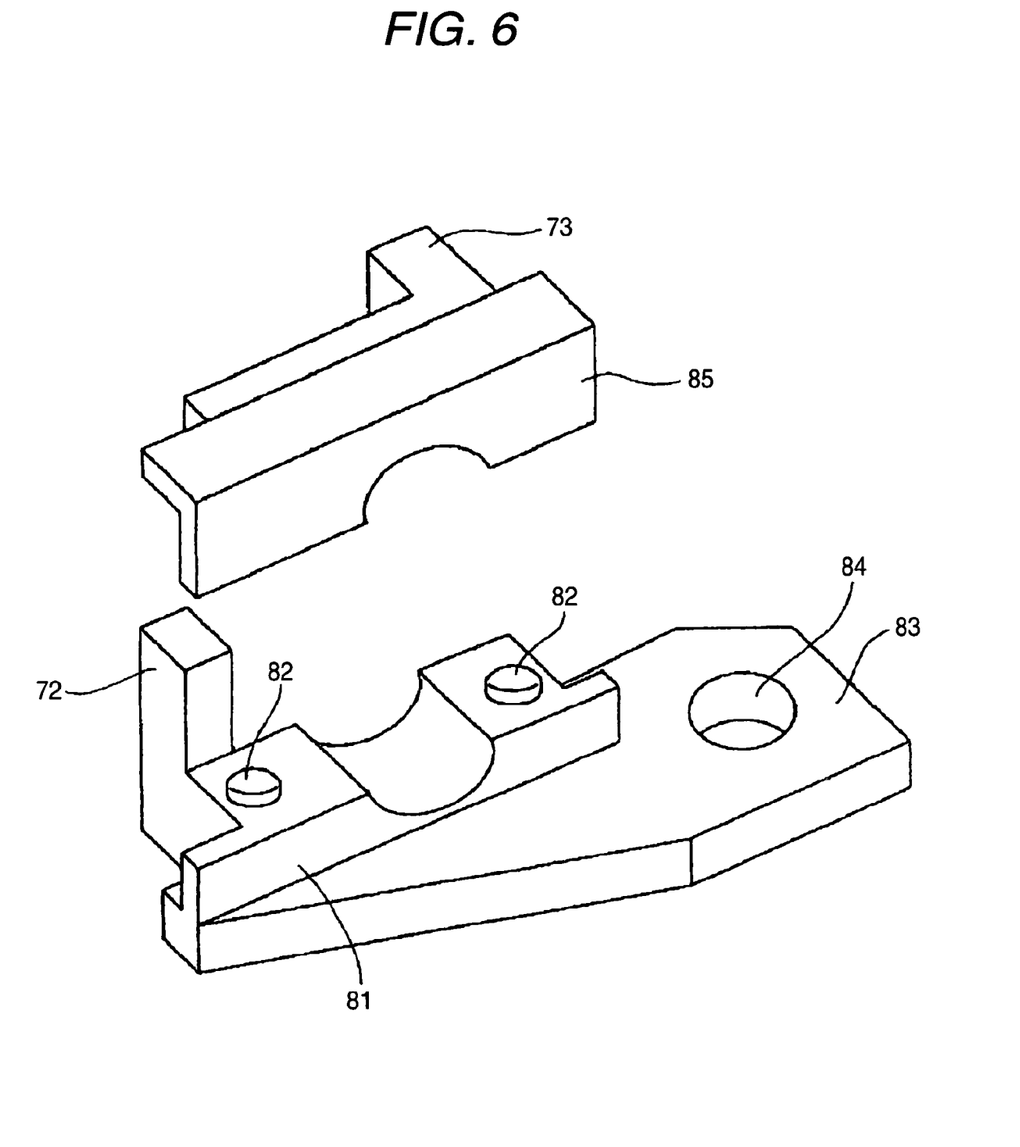
FIG. 6 is a schematic exploded view of the wire protective member.

The configuration of the wire protective member 7 used in the present embodiment is described by reference to FIGS. 5 and 6. As shown in FIG. 6, the wire protective member 7 is divided, at a position where the hole section 71 is transversely crossed, into a lower cap 81 and an upper cap 85. The lower cap 81 is provided with the projection piece 72 which is one of the pair of projection pieces, and the upper cap 85 is provided with the remaining projection piece 73. Positioning holes (not shown) formed in the upper cap 85 are fitted to positioning protuberances 82 provided on the lower cap 81, whereby the upper cap 85 is piled on the lower cap 81. Thus, as shown in FIG. 5, the wire protective member 71 having the hole 71 is formed. The lower cap 81 is provided integrally with a projection piece portion 83 for use in screw-engagement having a screw insertion hole 84.

As shown in FIG. 1, the lower case element 2 and the upper case element 3, both of which constitute the lamp case 1, are provided integrally with flanges 21, 31 for use in screw-engagement, respectively. As shown in FIG. 3, the lower cap 81 of the wire protective member 7 is placed in the lower case element 2, and the resin-covering wire 6 is placed on the lower cap 81. As shown in FIG. 4, after the upper cap 85 has been superimposed on the lower cap 81, the upper case element 3 of the lamp case 1 is fitted to the lower case element 2, whereupon the flanges 21, 31 of the upper and lower case elements 2, 3 are stacked on one top of the other. Further, the projection piece portion 83 of the wire protective member 7 is superimposed on the lower part of the flanges 21, 31. Consequently, the projection piece portion 83 and the flanges 21, 31, both of which are stacked one on top of the other, are fastened together by use of a single screw 8, thereby combining together the lamp case 1. The wire protective member 7 is also fastened to the lamp case 1 concurrently. By means of adoption of this structure, the necessity for use of extra screws for attaching the wire protective member 7 to the lamp case 1 is negated. Further, the wire protective member 7 is attached to the lamp case 1 concurrently with assembly of the lamp case 1, whereby mass-productivity of the lamp unit is enhanced. In addition, as a result of the lower cap 81 and the upper cap 85 of the wire protective member 7 are fastened together in the manner as mentioned above, the resin-covering wire 6 inserted into the hole 71 is nipped between the lower cap 81 and the upper cap 85, thereby readily minimizing the ventilation clearance in the location where the resin-covering wire 6 is inserted.

Figure 7:
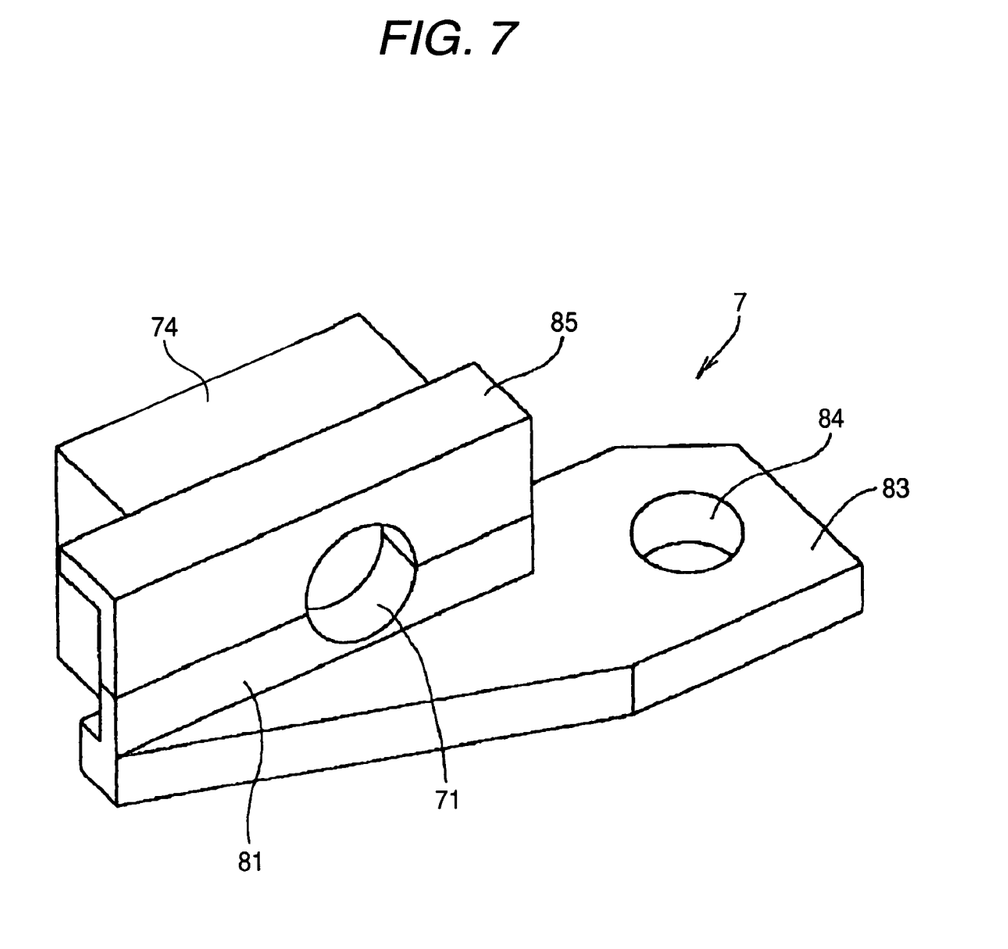
FIG. 7 is a schematic perspective view showing another example of the wire protective member.

In the present invention, as shown in FIG. 7, a projection portion 74 is provided on the wire protective member 7 in place of the projection pieces 72, 73. The projection portion 74 extends toward the rear end of the lamp 5 in a state of surrounding the coating 61 of the resin-covering wire 6. That is, the projection portion 74 works in the same manner as the projection pieces 72, 73.

As is evident from the above descriptions, according to the projector lamp unit of the present invention, there is adopted a simple structure of attaching one component called a wire protective member to the lamp case and inserting a resin-covering wire into a hole of the lamp case. Despite such a simple structure, there are yielded an advantage of prevention of thermal deterioration and melting of a coating of the resin-covering wire and prevention of infliction of damage to or fracture of a DVD, which would otherwise be caused by thermal deterioration; an advantage of prevention of thermal deterioration of the resin-covering wire, which would otherwise be caused by a hot air in the lamp case, or deterioration of the coating upon exposure to UV radiation; and an advantage of prevention of emission of the hot air in the lamp case to the outside from a location where the resin-covering wire is inserted into the lamp case. For all of these reasons, a lamp unit having a superior life time can be provided certainly, and there is also yielded an advantage of the user being able to use a safe, stable projector over a long period of time.

What is claimed is:

1. A projector lamp unit comprising:
   a lamp;
   a resin-covered wire attached to a rear end of the lamp;
   a lamp case, comprised of aluminum, and housing the lamp, the lamp case comprising:
   a first case element, and
   a second case element,
   wherein the first case element is fastened to the second case element by a screw;
   a wire protective member comprising:
   a first member element,
   a second member element, wherein the first member element and the second member element mate to provide a hole to pass the resin-covered wire, and
   a pair of projection pieces that extend toward a rear end of the lamp case and are disposed on opposite sides of the hole that passes the resin-covered wire, wherein the pair of projection pieces are fastened to the first case element and the second case element by the screw,
   wherein the wire protective member resin having a smaller thermal conductivity than the lamp case;
   wherein the wire protective member attaches to the rear end of the lamp case,
   the resin-covered wire is routed from the rear end of the lamp to the outside of the lamp case through the hole provided by the wire protective member,
   the resin-covered wire is nipped between the first member element and the second member element of the wire protective member, and
   a ventilation clearance of the hole is sealed by the resin-covered wire.

2. A projector lamp unit comprising:
   a lamp;
   a lamp case, housing the lamp;
   a wire protective member, attached to the lamp case, and comprised from resin having a smaller thermal conductivity than the lamp case; and
   a resin-covered wire, routed from the lamp to outside the lamp case through a hole provided with the wire protective member.

3. The projector lamp unit according to claim 2, wherein the resin-covering wire is routed from a rear end of the lamp and is inserted into the hole provided with the wire protective member attached to a rear end of the lamp case, and
   the wire protective member is provided with a projection extending toward the rear end of the lamp.

4. The projector lamp unit according to claim 3, wherein the projection projects so as to cover the resin-covered wire.

5. The projector lamp unit according to claim 2, wherein the wire protective member includes a first member having a part of the hole and a second member having the other part of the hole, and
   the resin-covered wire inserted into the hole is nipped between the first member and the second member.

6. The projector lamp unit according to claim 5, wherein a ventilation clearance of the hole is sealed by the resin-covered wire.

7. The projector lamp unit according to claim 2, wherein the lamp case includes a first case element and a second case element which are fastened together by a screw, and
   the wire protective member is provided with a projection piece portion fastened to the first and second case elements by the screw.

* * * * *